US011165817B2

(12) United States Patent
O'Hara et al.

(10) Patent No.: US 11,165,817 B2
(45) Date of Patent: Nov. 2, 2021

(54) MITIGATION OF NETWORK DENIAL OF SERVICE ATTACKS USING IP LOCATION SERVICES

(71) Applicant: Arbor Networks, Inc., Westford, MA (US)

(72) Inventors: Sean O'Hara, Ypsilanti, MI (US); Andrew David Mortensen, Ann Arbor, MI (US); Brian St. Pierre, Acworth, NH (US)

(73) Assignee: Arbor Networks, Inc., Westford, MA (US)

( * ) Notice: Subject to any disclaimer, the term of this patent is extended or adjusted under 35 U.S.C. 154(b) by 220 days.

(21) Appl. No.: 16/696,573

(22) Filed: Nov. 26, 2019

(65) Prior Publication Data

US 2021/0126940 A1  Apr. 29, 2021

Related U.S. Application Data

(60) Provisional application No. 62/925,667, filed on Oct. 24, 2019.

(51) Int. Cl.
*H04L 29/06* (2006.01)
*H04L 12/26* (2006.01)

(52) U.S. Cl.
CPC ........ *H04L 63/1458* (2013.01); *H04L 43/065* (2013.01); *H04L 43/0876* (2013.01);
(Continued)

(58) Field of Classification Search
CPC ... H04L 63/1458; H04L 67/42; H04L 9/3226; H04L 63/083; H04L 29/06782;
(Continued)

(56) References Cited

U.S. PATENT DOCUMENTS

| 5,113,499 A | * | 5/1992 | Ankney | H04L 29/00 |
| | | | | 340/5.74 |
| 7,474,299 B1 | * | 1/2009 | O'Hara | G06F 3/0482 |
| | | | | 312/223.2 |

(Continued)

FOREIGN PATENT DOCUMENTS

| EP | 1525522 A2 * | 4/2005 | ............. G06F 21/53 |
| EP | 3140750 B1 * | 12/2018 | ............. H04L 67/42 |

(Continued)

OTHER PUBLICATIONS

Al-Gburi et al., "Differentiating Security from Privacy in Internet of Things: A Survey of Selected Threats and Controls", 2018 (Year: 2018).*

(Continued)

*Primary Examiner* — Ondrej C Vostal
(74) *Attorney, Agent, or Firm* — Locke Lord LLP; Scott D. Wofsy; Christopher J. Capelli

(57) ABSTRACT

A computer method and system for detecting denial of service network attacks by analyzing intercepted data packets on a network to determine a user account associated with a preselected target host sought to be accessed via a user account login attempt. Determine if the login attempt exceeds a predetermined login value for previous failed login attempts associated with the user account sought to be accessed. Determine a geographic location associated with the login attempt if determined the login attempt exceeded the predetermined login value. Determine if a prior login attempt to the user account sought to be accessed was successful from the determined geographic location. Authenticate the login attempt to the user account sought to be accessed in the event it was determined a prior successful login attempt was made to the user account from the (Continued)

determined geographic location or no prior login attempts originated from the determined geographic location.

20 Claims, 3 Drawing Sheets

(52) U.S. Cl.
CPC .......... *H04L 63/107* (2013.01); *H04L 63/126* (2013.01); *H04L 63/1416* (2013.01); *H04L 2463/143* (2013.01)

(58) Field of Classification Search
CPC ......... H04L 29/06823; H04L 29/06925; H04L 63/107; G06F 21/00; G06F 2221/00; G06F 2221/07; G06F 2221/21
See application file for complete search history.

(56) References Cited

U.S. PATENT DOCUMENTS

| | | | | |
|---|---|---|---|---|
| 8,087,068 | B1* | 12/2011 | Downey | G06F 21/40 726/4 |
| 8,452,980 | B1* | 5/2013 | Black | G06F 21/554 713/185 |
| RE45,348 | E* | 1/2015 | Fiatal | H04L 63/30 380/255 |
| 9,049,211 | B1* | 6/2015 | Hearn | H04W 4/02 |
| 9,282,097 | B2* | 3/2016 | Agarwal | H04L 63/0815 |
| 9,300,643 | B1* | 3/2016 | Doane | H04L 63/08 |
| 9,396,316 | B1* | 7/2016 | Altman | H04L 63/102 |
| 9,462,013 | B1* | 10/2016 | Boss | H04L 63/1416 |
| 9,514,294 | B1* | 12/2016 | Hepburn | H04L 9/3226 |
| 9,697,348 | B1* | 7/2017 | Maresh | G06F 21/36 |
| 9,699,173 | B1* | 7/2017 | Roth | G06F 21/31 |
| 9,722,803 | B1* | 8/2017 | Ellingson | H04L 63/1458 |
| 9,811,653 | B1* | 11/2017 | Maresh | G06F 21/36 |
| 9,942,220 | B2* | 4/2018 | Bajenov | H04L 63/083 |
| 10,050,976 | B2* | 8/2018 | Disraeli | G06F 21/31 |
| 10,129,282 | B2* | 11/2018 | Jones | H04L 63/1425 |
| 2003/0149900 | A1* | 8/2003 | Glassman | H04L 63/0807 726/6 |
| 2005/0160280 | A1* | 7/2005 | Caslin | H04L 43/00 713/189 |
| 2005/0188222 | A1* | 8/2005 | Motsinger | H04L 63/08 726/5 |
| 2005/0216955 | A1* | 9/2005 | Wilkins | H04L 63/1408 726/23 |
| 2006/0069921 | A1* | 3/2006 | Camaisa | G06F 21/31 713/182 |
| 2008/0010678 | A1* | 1/2008 | Burdette | G06Q 30/0603 726/15 |
| 2008/0155651 | A1* | 6/2008 | Wasmund | G06F 21/55 726/2 |
| 2008/0276294 | A1* | 11/2008 | Brady | H04W 12/033 726/1 |
| 2008/0313721 | A1* | 12/2008 | Corella | H04L 9/3226 726/6 |
| 2010/0107225 | A1* | 4/2010 | Spencer | G06F 21/85 726/4 |
| 2011/0277027 | A1* | 11/2011 | Hayton | H04L 63/0815 726/8 |
| 2013/0061307 | A1* | 3/2013 | Livne | H04W 12/06 726/7 |
| 2015/0227731 | A1* | 8/2015 | Grigg | H04L 63/04 726/7 |
| 2015/0278494 | A1* | 10/2015 | Newstadt | H04L 67/10 726/3 |
| 2015/0310201 | A1* | 10/2015 | Sugiyama | G06F 21/552 726/7 |
| 2016/0164896 | A1* | 6/2016 | Baldonado | H04L 63/1425 726/23 |
| 2016/0261582 | A1* | 9/2016 | Lee | G06F 21/83 |
| 2017/0063829 | A1* | 3/2017 | Raounak | H04L 43/106 |
| 2017/0134362 | A1* | 5/2017 | Randall | H04L 63/083 |
| 2017/0214679 | A1* | 7/2017 | Lin | H04L 63/083 |
| 2017/0223000 | A1* | 8/2017 | Yoda | H04L 63/08 |
| 2017/0346809 | A1* | 11/2017 | Plotnik | H04L 63/1441 |
| 2017/0346851 | A1* | 11/2017 | Drake | H04L 63/0428 |
| 2018/0152299 | A1* | 5/2018 | Rossi | H04L 63/0884 |
| 2018/0247483 | A1* | 8/2018 | Lindsay | G06Q 20/102 |
| 2018/0288026 | A1* | 10/2018 | Callaghan | H04L 9/3226 |
| 2018/0288060 | A1* | 10/2018 | Jackson | H04L 63/102 |
| 2018/0288064 | A1* | 10/2018 | Ross | G06F 16/9535 |
| 2018/0295137 | A1* | 10/2018 | Zager | H04L 63/0853 |
| 2019/0190934 | A1* | 6/2019 | Peppe | H04L 63/1441 |
| 2019/0205511 | A1* | 7/2019 | Zhan | G06F 21/45 |
| 2019/0253451 | A1* | 8/2019 | Maxwell | G06F 21/46 |
| 2019/0356650 | A1* | 11/2019 | Leavy | H04L 63/0815 |
| 2020/0110870 | A1* | 4/2020 | Girdhar | H04L 63/108 |
| 2021/0044586 | A1* | 2/2021 | Sharma | H04L 67/42 |

FOREIGN PATENT DOCUMENTS

KR 101900494 B1 * 9/2018
WO WO-2006000802 A2 * 1/2006 ....... H04L 29/12132

OTHER PUBLICATIONS

Anand et al., "Method and apparatus for automating internet interactions", WO2003040941 A1, 2003 (Year: 2003).*
Anderson et al., "Interposed Request Routing for Scalable Network Storage", 2002 (Year: 2002).*
Cambridge Dictionary, "sought" 2021 (Year: 2021).*
Chu et al., "ALERT-ID: Analyze Logs of the Network Element in Real Time for Intrusion Detection", 2012 (Year: 2012).*
Chung et al., "NICE: Network Intrusion Detection and Countermeasure Selection in Virtual Network Systems", 2013 (Year: 2013).*
DeMeester, "C2 Auditing in the X Display Manager", 1993 (Year: 1993).*
Dzung et al., "Security for Industrial Communication Systems", 2005 (Year: 2005).*
Ferrag et al., "Authentication Protocols for Internet of Things: A Comprehensive Survey", 2017 (Year: 2017).*
Helmer et al., "Lightweight agents for intrusion detection", 2002 (Year: 2002).*
Husain et al., "User Authentication System using Cryptography Involving Arithmetic Operations", 2013 (Year: 2013).*
Jawandhiya et al., "A Survey of Mobile Ad Hoc Network Attacks", 2010 (Year: 2010).*
Kwak et al., "Analysis and Countermeasures of Security Vulnerability on Portal Sites", 2011 (Year: 2011).*
Merriam-Webster, "sought", 2021 (Year: 2021).*
Sadasivam et al., "Honeynet Data Analysis and Distributed SSH Brute-Force Attacks", 2018 (Year: 2018).*
Taylor et al., "Contextual, Flow-Based Access Control with Scalable Host-based SDN Techniques", 2016 (Year: 2016).*

* cited by examiner

MITIGATION OF NETWORK DENIAL OF SERVICE ATTACKS USING IP LOCATION SERVICES

FIELD OF THE INVENTION

The disclosed embodiments generally relates to monitoring network attacks, and more particularly, to preventing denial of service attacks using IP location services.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

With regards to network denial of service attacks, it is to be appreciated that services that use the Internet typically include services that use authentication based on user ID and a password. In this type of services, brute force attacks (also referred to below as "BF attacks") in which the user ID and password of another person are illegally gained are viewed as a problem.

A BF attack is an attack to access a communication apparatus such as a server that provides services and attempt an authentication (login) by using combinations of imaginable user IDs and passwords. This attempt is continued until the authentication succeeds. Therefore, if a communication apparatus has a BF attack, not only the user ID and password of a normal user are illegally gained but also a problem such as the occurrence of a failure due to an increase in a processing load of a server or the like arises.

A prior method for mitigating BF attacks involved detecting communication (access) that is suspected to be a BF attack by applying an intrusion detection system (IDS). In the detection of a BF attack by using the IDS, in a case in which, for example, an access pattern from a first IP address to a communication apparatus with a second IP address is similar to a pattern at the time of a BF attack, the presence or absence of similar accesses from the first IP address to communication apparatuses with other IP addresses is checked. Then, if it is detected that accesses in patterns similar to the pattern at the time of a BF attack were performed from the first IP address to a plurality of communication apparatuses with different IP addresses at times of the day that are almost the same, it is decided that a BF attack in which the first IP address is a transmission source (attack source) was performed.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a computer method and system for detecting denial of service network attacks by analyzing intercepted data packets on a network to determine a user account associated with a preselected target host sought to be accessed via a user account login attempt is described in which a determination is made if the login attempt exceeds a predetermined login value for previous failed login attempts associated with the user account sought to be accessed. Identification of a geographic location associated with the login attempt is then determined if it was determined the login attempt exceeded the predetermined login value. Next, a determination is then made as to whether a prior login attempt to the user account sought to be accessed was successful from the identified geographic location. The login attempt is then authenticated for the user account sought to be accessed in the event it was determined: 1) a prior successful login attempt was made to the user account sought to be accessed from the identified geographic location; or 2) no prior login attempts to the user account sought to be accessed were previously made from the identified geographic location.

Additionally, authentication is denied for the login attempt to the user account sought to be accessed that has exceeded the predetermined login value in the event it is determined no prior successful login attempts were made to the user account sought to be accessed from the identified geographic location. Denial of service mitigation actions may then be performed on the login attempt in the event authentication was denied.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
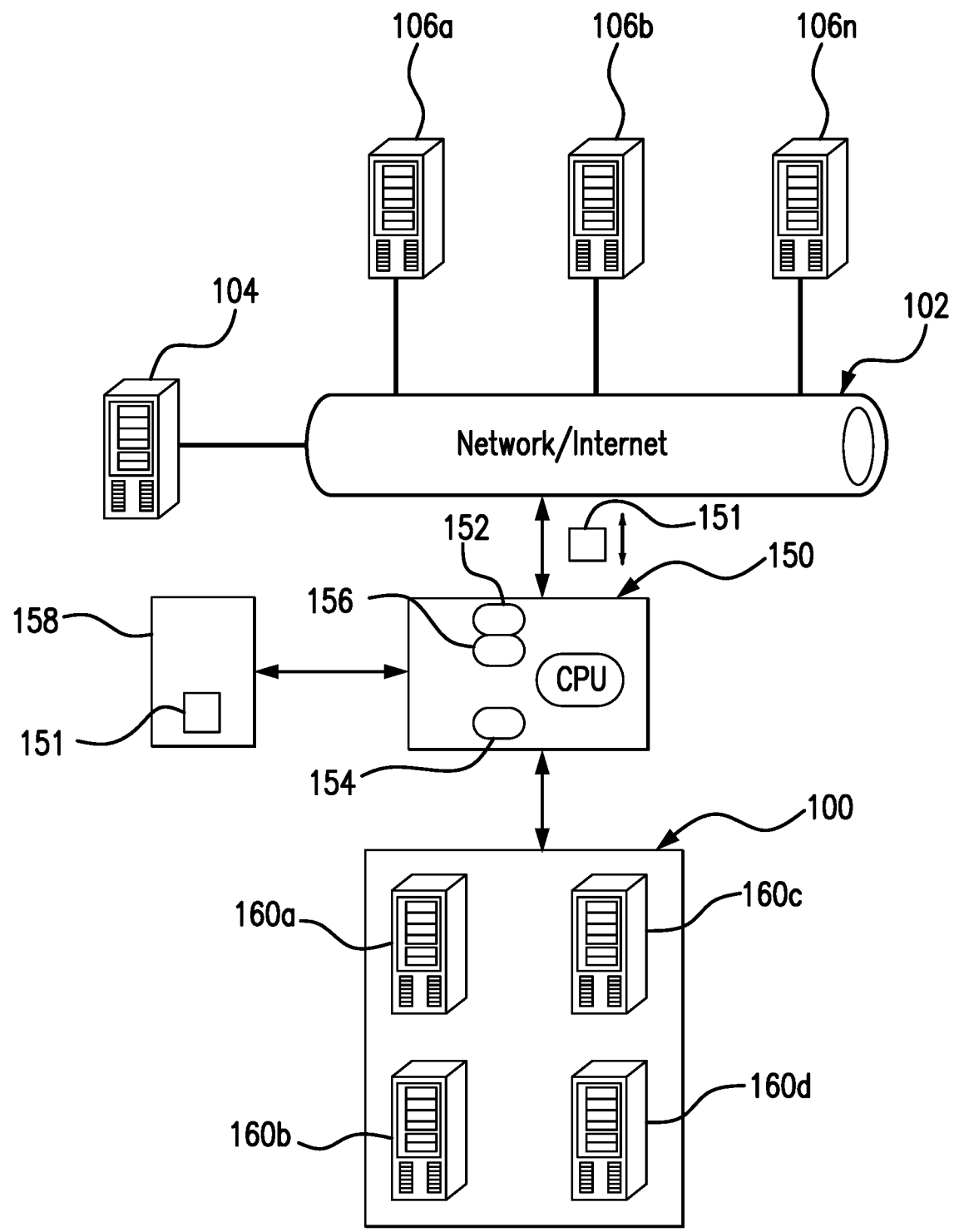
FIG. 1 illustrates an exemplary network communications system, in which an embodiment of the present invention may be implemented.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

The present embodiments relate to a method, apparatus and system to identify and defend against malicious network attacks. The present method collects relevant data from various network perspectives and stores the data in one or more central repositories. Network perspectives may comprise different endpoints or middle-points within a computer network. The collected data may be analyzed to better understand network traffic behavior and/or proactively identify potential malicious behavior.

In particular, modern web services typically utilized IP blacklists and whitelists to protect against a denial of service network attack known as a brute force login. It is to be appreciated that there have been significant limitations associated with prior technologies to mitigate brute force attacks due to the explicitness of passing or dropping traffic on a per IP basis. This is because most current web servers employ some IP blacklist plugins to mitigate denial of service attacks. For instance, plugins such as FAIL2BAN apply rate limiting to failed login attempts, essentially blacklisting IP addresses which exceed a limit for some period. While this may work when an attack comes from a single IP, significant shortcomings are presented if there is an attack from a reasonably sized botnet. A botnet is typically understood to consist of a number of Internet-connected devices, each of which is running one or more bots. Botnets can be used to perform distributed denial-of-service attack (DDoS attack), steal data, send spam, and allows the attacker to access a network coupled device and its network connection. It is to be understood that botnets of a sufficient size have the option to sleep for an amount of time between requests so as to stay below a rate limit. Additionally, larger botnets may have a sufficient amount of hosts to completely overpower a rate limiter of targeted network devices with repeat offenders making the mitigation completely useless.

In this regards, it is to be appreciated that IP whitelists may be utilized to permit the flow of traffic from IPs which are known to be valid and rate limit unknown IP addresses. This prior solution however is disadvantageous in scenarios where a user may travel between different geographic locations having different IPs, and is particularly disadvantageous if a user deviates from their known location(s) by visiting a location for the first time (e.g., a coffee shop, traveling on vacation, etc.).

In accordance with the illustrated embodiments, the aforesaid shortcomings of the prior solution is obviated with inclusion of an IP geographic location classifier for login attempts from certain IP addresses. As discussed below, storage is provided preferably for a configurable number of unique locations associated with user accounts when a successful login takes place. It is to be appreciated that the preciseness of the user locations may be configurable in real-time, but user login location defaults may also include a postal code, state, or country associated with the user login attempt.

As also discussed further below, in mitigating a brute force attack type, and in accordance with the illustrated embodiments, a verification check is made after a login rate limit for failed login attempts is exceeded. The location of the failed login request is determined and a lookup performed to determine if the user has previously logged in from the location associated with the failed login attempt. If the location does exists (as preferably stored in a database), and it is not associated with a successful login attempt, mitigation actions are then preferably performed regarding the attempted login request, including (but not limited to): a HTTP 401 response is returned; the request is dropped entirely without further action; the request is passed off to a rate limiting or otherwise authentication server which is dedicated for attack traffic (enabling the normal servers to operate as intended).

Turning now descriptively to the drawings, in which similar reference characters denote similar elements throughout the several views, FIG. 1 illustrates a generalized monitoring/detection system for implementing the aforesaid denial of service mitigation processes using IP location services. The exemplary embodiment of FIG. 1 depicts the relationship between a protected network 100, protection system 150, Internet 102, and external host devices 106a-106n. It is to be appreciated that protected network 100 preferably includes a plurality of servers 160a-160n preferably consisting of a plurality of server types, including, but not limited to: Generic; Web; DNS; Mail; VoIP; VPN; RLogin; and File Servers. It is to be appreciated that in accordance with an illustrated embodiment, the protection system 150 is configured and operable to operate as an attack detection and mitigation device for preventing a denial of service attack, such as a brute force attack (in addition to other types of denial of service attacks) on targeted devices (e.g., servers 106a-106n), that may or may not reside within a protected network 100.

Figure 3:
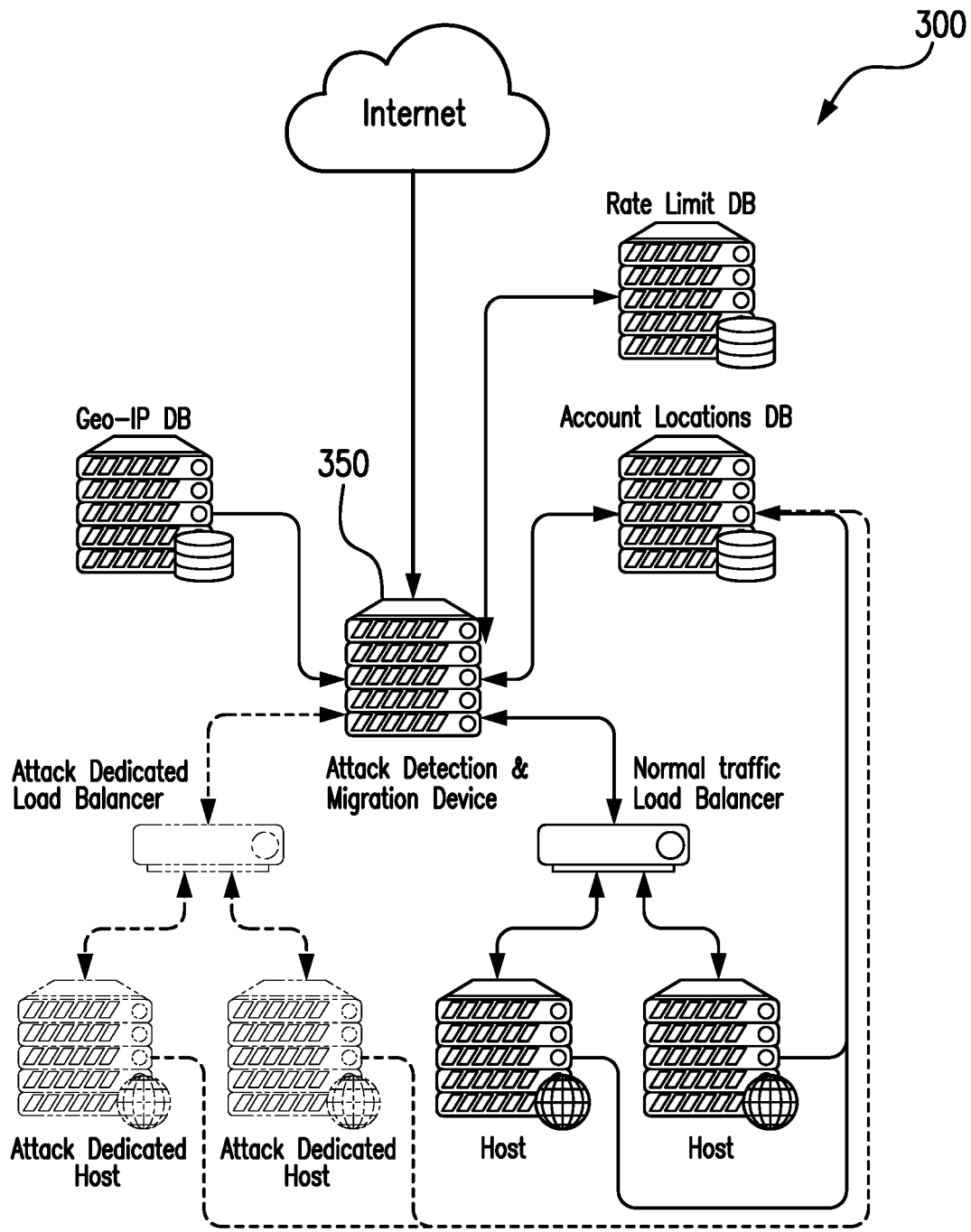
FIG. 3 illustrates an another exemplary network communications system, in which an embodiment of the present invention may be implemented.

It is to be appreciated that the illustrated embodiment of FIG. 1 is provided for ease of discussions purposes only for depicting a generalized exemplary environment of use for a denial of service protection system using IP location services. As such, it is to be understood the illustrated embodiment of FIG. 1 is not to be understood to be limiting, as other systems capable of carrying out the process for using IP location services to thwart a denial of service attack may be implemented, such as, for example, system 300 of FIG. 3.

In a typical implementation, the external host devices 106a-106n (also referred to as external devices or host devices) attempt to connect to protected devices 160a-160n within a protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a protection system 150 preferably located between the Internet 102 and the protected network 100. Usually, the protected network 100 is an enterprise network, such as a school network, business network, and government network, to list a few examples.

In other embodiments, the protection system 150 is located within the Internet, service provider network or enterprise network rather than as a network edge as illustrated. It is to be appreciated that when deployed within the protected network 100, traffic is diverted to the protection system 150.

The protection system 150 preferably includes a packet processing system preferably having an external high speed network interface 152 and a protected high-speed network interface 154. Typically, these interfaces are capable of handling 1-100 Gbps, for example. System 150 may further include processing modules, such as traffic analyzer 156 that preferably process the packets received at interfaces 152 and 154. Additionally, a central processing unit (CPU), random access memory (RAM), and one or more storage mediums 158 (such as a geolocation database 236, account locations database 226 and a user account rate limiter database 214) are preferably connected through buses and are used to further support the threat detection processing of the received packets in accordance with the illustrated embodiments. Computer code is preferably stored in storage medium and executed by the CPU of protection system 150. In one illustrated embodiment, the storage medium 158 may preferably include content-addressable memory (CAM), which is memory designed for use in very high speed searching applications. It is noted CAM memory operates different from the more commonly used random access memory (RAM). With RAM memory a memory address is specified and the data stored at that address is returned. With CAM memory, the entire memory is searched to see if specified data are stored anywhere in the memory. The storage medium 158 may preferably provide: a geolocation database 236 for associating an IP address with a geographic location; an account location database 226 associating geographic locations with successful user logins; and a user account rate limiter database 214 (as all described further below) as well as other possible information such as predefined filter rules and other analyzing criteria.

In a typical implementation, the protection system 150 authenticates login attempts from external host devices 104, 106a-106n before allowing the external devices to access the protected devices 160a-160n within the protected network 100.

During an attack, the protection system 150 seeks to distinguish between attack traffic 104 and traffic made by legitimate host devices 106a-106n to targeted host devices 160a-160n, which is subsequently used by network security processes to determine countermeasures for mitigating a denial of service attack, particularly a brute force type attack (preferably of varying severity to mitigate a potential attack). In some embodiments, the protection device 150, in accordance with the illustrated embodiments, is configured and operable to conduct a verification process on received IP packets to determine whether a login request to one or more of the protected devices 160a-160n is a legitimate login attempt or one associated with a brute force denial of service attack, as now mentioned in further detail in conjunction with FIG. 2

Figure 2:
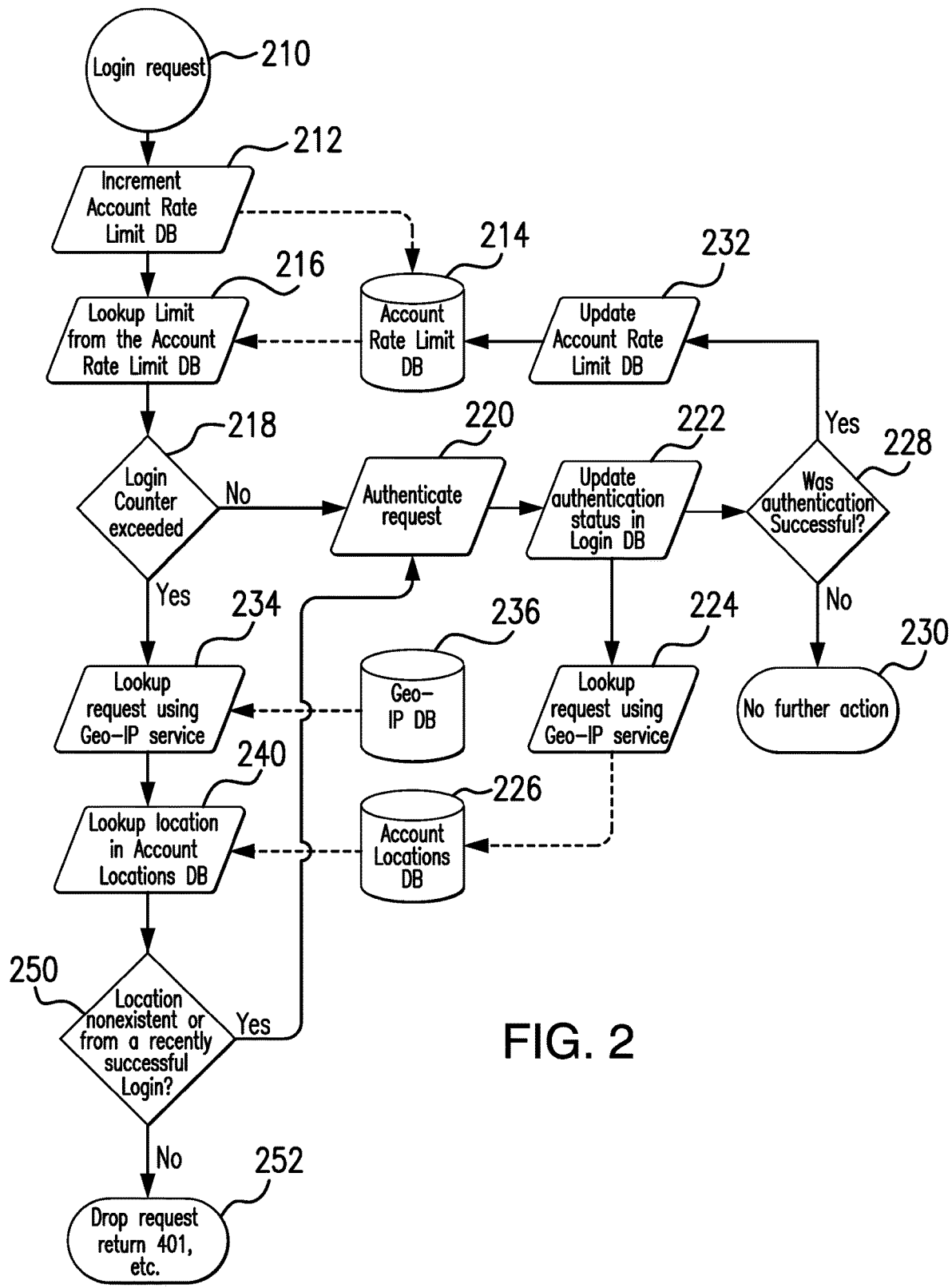
FIG. 2 is a flowchart of operational steps performed in accordance with an illustrative embodiment of the present invention.

With reference now to FIG. 2 (and with continuing reference to FIG. 1) shown is flowchart depicting certain operational steps performed by the protection device 150 in accordance with illustrative embodiments. Before turning to the descriptions of FIG. 2, it is noted that the flow diagram shown therein is described, by way of example, with reference to components shown in FIG. 1, although these operational steps may be carried out in any system and are not limited to the scenario shown in the aforementioned figures. Additionally, the flow diagram in FIG. 2 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Starting at step 210, in a traffic flow 151 received by the protection device 150, included in the traffic flow is IP packets from one or more external devices 104, 106a-106n requesting a user account login to one or more protected devices 160a-160n. A counter (step 212) is then caused to be incremented in a rate limit counter device 214, wherein the incremented counter 214 is associated with the user account subject to the aforesaid login request. The protection device 150 then preferably lookups (e.g., from a predefined table) a login rate limit (preferably for a prescribed time period) associated with the user account subject to the aforesaid login request from an external device 104, 106a-106n (step 216). A determination is then made as to whether the attempted login request has caused the aforesaid login counter device to exceed a predefined limit (step 218). If no, then the login request is authenticated (step 220) and a login database for the requested user account associated with the protection device 150 is provided with a status update (step 222) indicating whether the login attempt was successful (e.g., was the correct password entered?) and the geographic location associated with IP address requesting a user account login (step 224) (preferably via reference to account location database 226). A determination is then made as to whether the login attempt was successful (step 228). If no, the login attempt to the requested user account fails and no further action is taken by the protection device (step 230). If yes, the login to the requested user account is successful, then an update is preferably provided for the aforesaid rate limit (e.g., the rate limit is preferably reset) for login attempts to the subject user account, as prescribed by the rate limit counter device 214 (step 232).

Returning now to step 218, if yes, the attempted login request has caused the aforesaid login counter device 214 to exceed a predefined limit, then a lookup is made (step 234) to geolocation database 236 to determine the geolocation associated with the request originating from the external device 104, 106a-106n sending such a login request. It is to be appreciated the IP address associated with the request may be used to determine geographic location origination associated with the aforesaid user account login, in which scenario the geolocation database 236 includes a listing of IP addresses and their associated geographic locations, which is preferably periodically updated. Alternatively, the geographic location associated with the aforesaid login request may use information contained in the HTTP header of the sent request indicating an associated geographic location (e.g., requested language (e.g., French) and/or a country of origin (e.g., France)).

Once the geographic location associated with the requested login is determined (step 234), a lookup to account location database 226 is preferably performed to identify whether a successful prior authenticated login was made from the aforesaid determined geographic location for the subject requested user account login (step 240). This enables a determination to be made as to whether the determined geographic location is associated with a previously successful authentication for login access to the subject requested user account (step 250). For instance, has a request originating from an external device 106a-106n located in Stamford, Conn. been previously associated with a successful authentication for user login access to a requested user account associated with a device 160a-160n. If yes, the login attempt is authenticated, then the process proceeds to step 220, as explained above. If no, then the protection device 150 determines the request for access to a user account maybe originating from a device (e.g., device 104) attempting to inflict a denial of service attack (e.g., a brute force attack) on a protected device 160a-160n. The protection device 150 may then be configured and operable to perform mitigation actions on the request, including (but not limited to): a HTTP 401 response is returned to the requesting device 104; the request is dropped entirely without further action; the request is passed off to a rate limited or otherwise authentication server which is dedicated for attack traffic (relieving the normal servers to do business as usual).

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method performed by a computer system having one or more processors and memory storing one or more programs for execution by the one or more processors for handling requests to a protected computer network, the method comprising steps of:

intercepting data communications occurring between one or more external hosts seeking a user account to have login access to a preselected target host in the protected computer network, the intercepted data communication comprising data packets;

analyzing the intercepted data packets to determine the user account associated with the preselected target host sought as accessed via the user account as a login attempt;

determining if the login attempt exceeds a predetermined login value for previous failed login attempts associated with the user account sought as accessed;

determining a geographic location associated with the login attempt if determined the login attempt exceeded the predetermined login value;

determining if a prior login attempt to the user account sought as accessed was successful from the determined geographic location; and authenticating the login attempt to the user account sought as accessed that has exceeded the predetermined login value in an event the login attempt was determined as the prior successful login attempt was made to the user account sought as accessed from the determined geographic location.

2. The method as recited in claim 1, further including authenticating the login attempt to the user account sought as accessed that has exceeded the predetermined login value in the event the login attempt was determined as no prior login attempts to the user account sought as accessed were previously made from the determined geographic location.

3. The method as recited in claim 2, further including denying an authentication of the login attempt to the user account sought as accessed that has exceeded to the predetermined login value in the event the login attempt was determined as no prior successful login attempts were made to the user account sought as accessed from the determined geographic location.

4. The method as recited in claim 1, further including authenticating the login attempt to the user account sought as accessed in the event the login attempt is determined as the login attempt does not exceed the predetermined login value for previous failed login attempts associated with the user account sought as accessed.

5. The method as recited in claim 4, further including in the event the login attempt to the user account sought as accessed was authenticated, determining whether the authenticated login attempt was successful to the user account sought as accessed.

6. The method as recited in claim 5, further including resetting the predetermined value for previous failed login attempts associated with the user account sought as accessed in the event the login attempt was successful.

7. The method as recited in claim 2, further including in the event the login attempt to the user account sought as accessed was authenticated, determining whether the authenticated login attempt was successful to the user account sought as accessed.

8. The method as recited in claim 7, further including resetting the predetermined login value for previous failed login attempts associated with the user account sought as accessed in the event the login attempt was successful.

9. The method as recited in claim 1, wherein the step of determining if a prior login attempt to the user account sought as accessed was successful from the determined geographic location includes determining the geographic location associated with the login attempt by analyzing an IP address associated with the login attempt.

10. The method as recited in claim 9, wherein the step of determining a geographic location associated with the IP address associated with the request for the user account to have login access includes making reference to a database having a listing of IP addresses matched to associated geographic locations.

11. The method as recited in claim 1, wherein the step of determining if a prior login attempt to the user account sought as accessed was successful from the determined geographic location includes the determining a geographic location associated with the login attempt by analyzing information contained in a HTTP header associated with the received data packets for the login attempt.

12. The method as recited in claim 3, further including performing a denial of service of mitigation actions on the login attempt in the event the authentication was denied for the login attempt to the user account sought as accessed.

13. The method as recited in claim 12, wherein the mitigation actions includes one or more of the following:
   a HTTP 401 response is transmitted;
   the request for the login attempt is dropped; and
   the request for the login attempt is subject to traffic flow rate limitations.

14. A computer system for handling requests to a protected computer network, comprising:
   one or more data bases having memory configured to store instructions;
   a processor disposed in communication with said memory,
   wherein said processor upon execution of the instructions is configured to:
      intercept data communications occurring between one or more external hosts seeking a user account to have login access to a preselected target host in the protected computer network, the intercepted data communication comprising data packets;
      analyze the intercepted data packets to determine the user account associated with the preselected target host sought as accessed via the user account as a login attempt;
      determine if the login attempt exceeds a predetermined login value for previous failed login attempts associated with the user account sought as accessed wherein the predetermined login value is stored in the one or more databases;
      determine a geographic location associated with the login attempt if determined the login attempt exceeded the predetermined login value;
      determine if a prior login attempt to the user account sought as accessed was successful from the determined geographic location; and
      authenticate the login attempt to the user account sought as accessed that has exceeded the predetermined login value in the event the login attempt was determined as the prior successful login attempt was made to the user account sought as accessed from the determined geographic location.

15. The computer system as recited in claim 14, wherein the processor is further configured to authenticate the login attempt to the user account sought as accessed that has exceeded to the predetermined login value in the event the login attempt was determined as no prior login attempts to the user account sought as accessed were previously made from the determined geographic location.

16. The computer system as recited in claim 14, wherein the processor is further configured to:
   deny an authentication of the login attempt to the user account sought as accessed that has exceeded to the predetermined login value in the event the login attempt was determined as no prior successful login attempts were made to the user account sought as accessed from the determined geographic location; and
   perform a denial of service of mitigation actions on the login attempt in the event the authentication was denied for the login attempt to the user account sought as accessed.

17. The computer system as recited in claim 14, wherein the processor is further configured to:
   authenticate the login attempt to the user account sought as accessed in the event the login attempt is determined as the login attempt does not exceed the predetermined login value for previous failed login attempts associated with the user account sought as accessed;
   determine whether the authenticated login attempt was successful to the user account sought as accessed; and
   reset the predetermined login value in the event the login attempt was successful.

18. The computer system as recited in claim 15, wherein the processor is further configured to:
   determine whether the authenticated login attempt was successful to the user account sought as accessed in the event the login attempt to the user account sought as accessed was authenticated; and
   reset the predetermined login value in the event the login attempt was successful.

19. The computer system as recited in claim 15, wherein the processor is further configured to:
   determine if a prior login attempt to the user account sought as accessed was successful from the determined geographic location includes determining the geographic location associated with the login attempt by analyzing an IP address associated with the login attempt with reference to the one or more databases configured to a have a listing of IP addresses matched to associated geographic locations.

20. A method performed by a computer system having one or more processors and memory storing one or more programs for execution by the one or more processors for handling requests to a protected computer network, the method comprising steps of:
   intercepting data communications occurring between one or more external hosts seeking a user account to have login access to a preselected target host in the protected computer network, the intercepted data communication comprising data packets;
   analyzing the intercepted data packets to determine the user account associated with the preselected target host sought as accessed via the user account as a login attempt;
   determining if the login attempt exceeds a predetermined login value for previous failed login attempts associated with the user account sought as accessed;
   authenticating the login attempt in the event the login attempt is determined the login attempt does not exceed a predetermined login value for previous failed login attempts associated with the user account sought as accessed;
   determining a geographic location associated with the login attempt if determined the login attempt exceeded the predetermined login value;
   determining if a prior login attempt to the user account sought as accessed was successful from the determined geographic location;
   authenticating the login attempt to the user account sought as accessed that has exceeded the predetermined login value in the event the login attempt was determined:

1) a prior successful login attempt was made to the user account sought as accessed from the determined geographic location; or
2) no prior login attempts to the user account sought as accessed were previously made from the determined geographic location;

denying the authentication of the login attempt to the user account sought as accessed that has exceeded to the predetermined login value in the event the login attempt was determined as no prior successful login attempt were made to the user account sought as accessed from the determined geographic location; and perform a denial of service of mitigation actions on the login attempt in the event the authentication was denied for the login attempt to the user account sought as accessed.

* * * * *